United States Patent
Moore et al.

(10) Patent No.: US 10,091,288 B2
(45) Date of Patent: Oct. 2, 2018

(54) ORDERED EXECUTION OF TASKS

(71) Applicant: Comcast Cable Communications, LLC, Philadelphia, PA (US)

(72) Inventors: Jonathan Moore, Philadelphia, PA (US); Vincent Parrella, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 480 days.

(21) Appl. No.: 14/668,451

(22) Filed: Mar. 25, 2015

(65) Prior Publication Data
US 2016/0285969 A1     Sep. 29, 2016

(51) Int. Cl.
*H04L 29/08* (2006.01)
*G06F 9/48* (2006.01)

(52) U.S. Cl.
CPC .......... *H04L 67/1095* (2013.01); *G06F 9/485* (2013.01); *H04L 67/325* (2013.01); *G06F 2201/835* (2013.01)

(58) Field of Classification Search
None
See application file for complete search history.

(56) References Cited

U.S. PATENT DOCUMENTS

| | | | |
|---|---|---|---|
| 7,937,482 B1 | 5/2011 | Vermeulen et al. | |
| 8,458,517 B1 | 6/2013 | Vermeulen et al. | |
| 8,560,368 B1 * | 10/2013 | Maity | G06Q 10/0631 705/7.13 |
| 8,572,031 B2 | 10/2013 | Merriman et al. | |
| 2004/0111430 A1 * | 6/2004 | Hertling | G06Q 10/06 |
| 2006/0129652 A1 * | 6/2006 | Petrovskaya | G06F 9/46 709/208 |
| 2008/0071853 A1 * | 3/2008 | Mosier | H04L 67/1095 709/201 |
| 2008/0178185 A1 * | 7/2008 | Okada | G06F 11/1469 718/103 |
| 2009/0327465 A1 * | 12/2009 | Flegg | H04L 41/0803 709/223 |
| 2011/0246528 A1 | 10/2011 | Hsieh et al. | |
| 2012/0011398 A1 | 1/2012 | Eckhardt et al. | |
| 2012/0131090 A1 | 5/2012 | Doddavula | |
| 2014/0325517 A1 * | 10/2014 | Takahashi | G06F 9/5077 718/102 |
| 2015/0067028 A1 * | 3/2015 | Kumar | H04L 67/10 709/203 |

OTHER PUBLICATIONS

Vector Clock, Wikipedia, retrieved Mar. 7, 2014; <http://en.wikipedia.org/w/index.php?title=Vector_clock&oldid=596059265>.

(Continued)

*Primary Examiner* — Thomas J Dailey
(74) *Attorney, Agent, or Firm* — Banner & Witcoff, Ltd.

(57) ABSTRACT

Systems and methods for synchronizing a network are described. Multiple nodes, for example, may execute tasks (e.g., updates) in an order based on task identifiers and/or local clock values for each of the nodes. When a node receives a task, it may determine whether to execute the task or to store the task for future execution. Nodes may generate identifiers for the task and send the task and identifier to one or more other nodes, such as via a gossip protocol.

20 Claims, 7 Drawing Sheets

(56) References Cited

OTHER PUBLICATIONS

Lamport timestamps, Wikipedia, retrieved Mar. 7, 2014; <http://en.wikipedia.org/wiki/Lamport_timestamps>.
The Quick Guide to GUIDs, Better Explained, Apr. 18, 2007; <http://betterexplained.com/articles/the-quick-guide-to-guids/>.
Clock Synchronization, Paul Krzyzanowski; Lectures on distributed systems, Rutgers University—CS 417: Distributed Systems, 2002.
Time, Clocks, an the Ordering of Events in a Distributed System, Leslie Lamport, Comm. ACM (vol. 21: No. 7), Jul. 1978.
Gossip protocol, Wikipedia; retrieved Mar. 7, 2014; <http://en.wikipedia.org/wiki/Gossip_protocol>.
Directed Gossip Algorithms, Consensus Problems, and Stability Effects of Noise Trading, Martin Schmalz et al., Tokyo Institute of Technology, last dated 2007.
Impossibility of Distributed Consensus with One Faulty Process, Michael J. Fischer et al., Journal of the Association for Computing Machinery, vol. 32, No. 2, Apr. 1985, pp. 374-382.
Egalitarian Paxos, Iulian Moraru et al., Parrallel Data Laboratory: Carnegie Mellon University, Jul. 2012.
In Search of an Understandable Consensus Algorithm, Diego Ongaro et al., Stanford University, draft of Feb. 22, 2014.
Paxos Made Simple, Leslie Lamport, Nov. 1, 2001.

\* cited by examiner

ORDERED EXECUTION OF TASKS

BACKGROUND

Nodes, such as servers, may provide services to one or more devices, such as client devices. If a particular node fails, the devices served by that node might not be able to access the services provided by the failed node. However, if the node is part of a network of nodes, such as a server cluster, another node may provide those services. In order for the other node to provide the same services, the nodes in the network may be kept synchronized with one another. Synchronization is currently accomplished using known consensus protocols, such as Paxos, RAFT, and Egalitarian Paxos. A frequent drawback of these consensus protocols is that a single node (or just a handful nodes) is typically designated as the leader node assigned to keep the other nodes in the network synchronized. Using a small number of leader nodes may limit the overall throughput of the network, causing the nodes to synchronize at a slow rate. These and other problems are addressed by the present disclosure.

SUMMARY

Some of the various features described herein relate to a system and method for nodes in a network to execute tasks (e.g., updates) in a particular order. The order of execution may be based on task identifiers and/or local clock values for each of the nodes. For example, a node may receive a task and determine whether the task is stable with respect to one or more other nodes and execute the task. Otherwise, the node may determine that the task is not stable with respect to the one or more other nodes and store the task for future execution. For example, in response to a determination that a first task originated from a first node in a network of nodes, the method may comprise determining, by a second node in a network of nodes, whether the second node has executed a second task originating from the first node. The second task may precede the first task in an order of execution. The method may comprise determining that the first task is stable at the second node with respect to the first node if the second node has executed the second task. Furthermore, the first task may be stable at the second node with respect to the first node if any tasks that the first node would send to the second node in the future should be executed after the first task. The second node may execute the first task in response to determining that the first task is stable at the second node with respect to the first node. Executing the first task may be further responsive to a determination that the first task is stable at the second node with respect to a third node.

In another aspect, a method may comprise determining that the first task is not stable at the second node with respect to the first node if the second node has not executed the second task. The second node may store the first task in memory in response to determining that the first task is not stable at the second node with respect to the first node. In some aspects, the second node may receive and execute the second task after storing the first task in memory. Responsive to executing the second task, the second node may execute the first task.

In other aspects, one or more steps may be performed prior to determining whether the second node has executed the second task. Exemplary steps may include determining a first sequence number for the first task, determining a second sequence number for the second task, determining whether the second sequence number for the second task is one less that the first sequence number for the first task, and determining that the second task precedes the first task in an order of execution if the second sequence number for the second task is one less that the first sequence number for the first task.

Some of the various features described herein relate to a system and method for determining whether a first task originated from a first node in a network of nodes. If the first task did not originate from the first node in the network of nodes, the method may comprise determining, by a second node in the network of nodes, whether a first timestamp for the first task is prior in time to a second timestamp for a second task originating from the first node and previously executed by the second node. The method may comprise determining that the first task is stable at the second node with respect to the first node if the first timestamp for the first task is prior in time to the second timestamp for the second task. The second node may execute the first task in response to determining that the first task is stable at the second node with respect to the first node. Executing the first task may be further responsive to a determination that the first task is stable at the second node with respect to a third node.

In yet another aspect, the method may comprise determining that the first task is not stable at the second node with respect to the first node if the first timestamp for the first task is not prior in time to the second timestamp for the second task. The second node may store the first task in memory in response to determining that the first task is not stable at the second node with respect to the first node. Additionally or alternatively, if the first timestamp for the first task is not prior in time to the second timestamp for the second task, the method may comprise determining whether a latest clock value for the first node is greater than the first timestamp for the first task. It may also be determined whether a maximum sequence number for the first node is equal to a sequence number for the second task. It may be determined that the first task is stable at the second node with respect to the first node if the latest clock value for the first node is greater than the first timestamp for the first task and the maximum sequence number for the first node is equal to the sequence number for the second task.

A determination that the first task did not originate from the first node may comprise a determination that a third node in the network of nodes received the first task from a client device that generated the first task. Additionally or alternatively, the determination that the first task did not originate from the first node may comprise a determination that a third node in the network of nodes is identified in a task identifier of the first task.

Some of the various features described herein relate to a system and method for receiving, by a first computing device, a task. The first computing device may generate an identifier for the task. The identifier for the task may comprise a device identifier that identifies the first computing device, a sequence number that identifies an order of task generation at the first computing device, and a timestamp based on a clock value for the first computing device. In some aspects, generating the identifier for the task may be responsive to a determination that the first computing device received the task from a client device that generated the task. The first computing device may send the task and the identifier for the task to a second computing device. The identifier for the task may be used to determine whether to execute the task or to store the task for future execution.

The method may further comprise receiving, by the first computing device, a second task. The first computing device may generate a second identifier for the second task. The second identifier for the second task may comprise the device identifier identifying the first computing device, a second sequence number that is one greater than the sequence number of the identifier for the first task, and a second timestamp based on a current clock value for the first computing device.

In some aspects, a non-transitory computer-readable medium storing computer-readable instructions that, when read by a computing device, may cause the computing device to perform various method steps previously described and described in the present disclosure.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
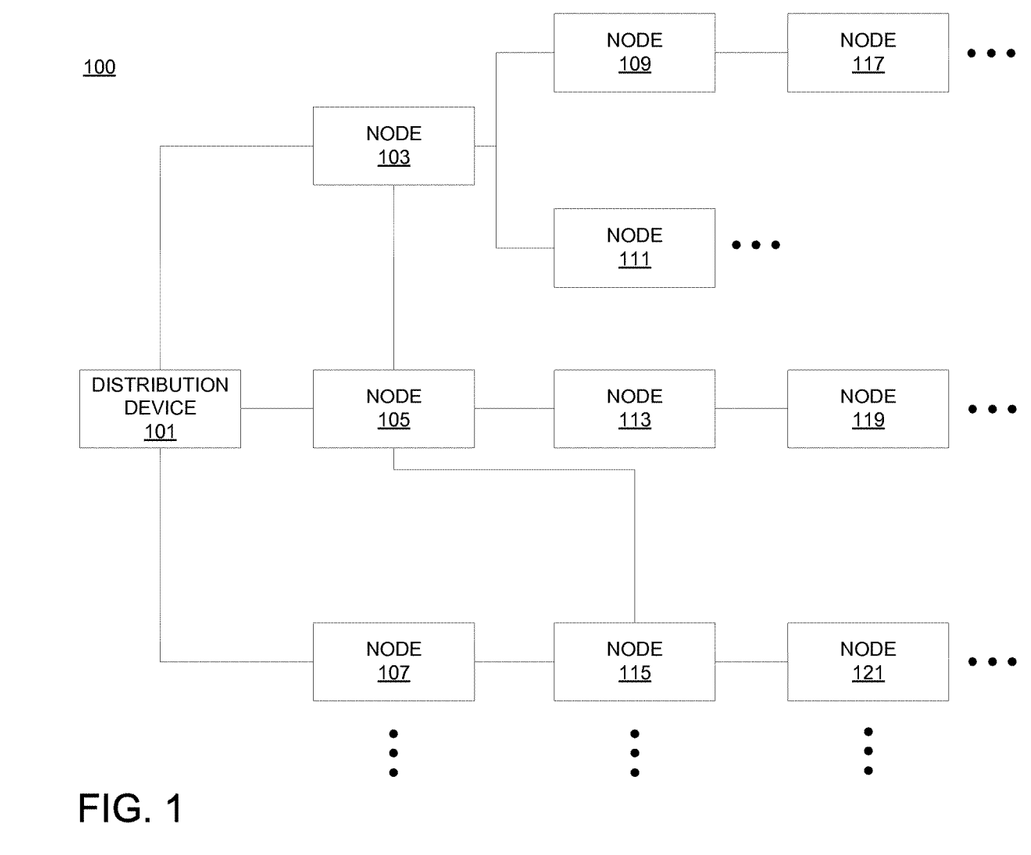
FIG. 1 illustrates an example network of nodes according to one or more illustrative aspects of the disclosure.

FIG. 1 illustrates an example network 100 of nodes (Node 103, 105, 107, 109, 111, 113, 115, 117, 119, 121, and so on) on which many of the various features described herein may be implemented. A computing device, which may run a client application (not illustrated), may generate a task and send the task to a distribution device 101 (or multiple distribution devices), such as a load balancer. The task may comprise a request (e.g., a web service request) for a node to execute a computing operation, such as to update the node's software or firmware. Another exemplary task may be a request to update particular data values held in memory, such as in stable storage. For example, the nodes may collaborate to maintain a consistent view of a bank account balance, and tasks may represent withdrawals, deposits, transfers, or updates thereto. The distribution device 101 (or client generating the task) may send the task to a port-of-entry node (e.g., computing devices, such as servers), such as Node 103, Node 105, Node 107, or another port-of-entry node (not illustrated). In other words, the port-of-entry node receiving the task from the distribution device 101 may originate the task and propagate the task to other nodes in the network 100. The distribution device 101 and the nodes in the network 100 may communicate over a series of interconnected communication links (e.g., coaxial cables, optical fibers, wireless connections, etc.). The communication links may include components not illustrated, such as splitters, filters, amplifiers, etc. to help convey the messages clearly. Portions of the links may also be implemented with fiber-optic cable, while other portions may be implemented with coaxial cable, other links, or wireless communication paths.

The node(s) receiving the task from the distribution device 101 may send the task to one or more other nodes. For example, if Node 103 receives a task, Node 103 may send the task to Node 109 and Node 105. The node(s) may use a gossip protocol (also referred to as an epidemic protocol) for sending tasks to other nodes. One goal of using the gossip protocol is for all or many of the nodes (e.g., a majority) to receive and execute the same task. For example, Node 103 may send the task to a subset of other nodes (e.g., five other nodes), and each of those other nodes may further forward the task to a subset of other nodes (e.g., five additional nodes). As nodes receive and share tasks, the task may eventually propagate to most of the nodes in the network 100. When one node fails, other nodes may continue to operate and provide services to client devices on behalf of the failed node if the nodes remain synchronized (e.g., by executing the same tasks, in the same order). The gossip protocol may be very efficient for large networks of nodes (e.g., large server clusters) and beneficial where other methods of propagating tasks, such as atomic broadcasts, cannot be used. Furthermore, because any node can perform task intake and distribution, the network need not designate leader nodes as is done in conventional consensus protocols. This allows for higher overall throughput than is available in conventional consensus protocols.

Before a node sends the task to another node, the sending node, such as a port-of-entry node, may generate an identifier for the task (e.g., <n, s, t>). The task identifier may include an identifier for the sending node (n), a local sequence number (s), and a local timestamp (t). As will be discussed in further detail in the examples that follow, and particularly with reference to FIGS. 5, 6A, and 6B, the receiving node may use the task identifier to determine whether to execute the task or store the task (and execute the task at a future time). Determining whether to execute or store a task may also be based on the latest clock entry (or most recent clock entry) for a particular node, as will now be discussed.

Each node may maintain a local clock that identifies the current time from the perspective of that node. In addition to its own local clock, each node may maintain a vector of clocks comprising the local clocks for one or more other nodes in the network. In some aspects, the vector of local clocks may comprise the latest clock reading that is known for each of the other nodes. For example, Node 103 illustrated in FIG. 1 may maintain a local clock for itself. Its local clock may currently read a counter value of 17. Node 103 may also maintain a vector of clocks including the latest clock readings for Node 109 (e.g., 19), Node 111 (e.g., 14), Node 113 (e.g., 15), and Node 115 (e.g., 17). Alternatively, the clock values may comprise hour/minute/second readings. For example, the vector of clocks may comprise values of 13:54:17 for Node 103, 14:01:54 for Node 109, 13:54:12 for Node 111, 13:52:15 for Node 113, and 13:54:17 for Node 115. Counters and hour/minute/second clock readings are merely exemplary, and the vector of clocks may store clock values in any other format. In some aspects, Node 103 may maintain a vector of clocks for all, substantially all, or a majority of the nodes in the network 100.

Nodes may exchange local clock values using a variety of methods. A node may include its latest clock reading with each message that it sends to another node, and each node that receives the message may store the clock reading in its vector of clocks. For example, the local timestamp included in the task identifier may be used by the receiving node as the latest clock reading for the sending node. Additionally or alternatively, nodes may occasionally or periodically choose another node in the network 100 and send a message to the other node with an updated local clock value, e.g., without necessarily sending the local clock with a task. For example, clock values may be sent during idle times, such as when the sending node is not sending a task or other message.

The clock messages exchanged between nodes may include additional information. For example, the sending node may include the maximum and/or current local sequence number used by the sending node in the message having the latest clock reading. The receiving node may store the maximum and/or current local sequence number in the vector of clocks. Additionally or alternatively, the sending mode may send the latest clock reading for one or more other nodes that is stored in the sending node's vector of clocks. For example, Node 103 may send its local clock reading to Node 105. Node 103 may also send the local clock readings for Nodes 109, Node 111, and/or Node 117 if Node 103 has the clock readings for Nodes 109, Node 111, and/or Node 117 stored in its vector of clocks. An exemplary vector of clocks for Node 103 is illustrated in the table below.

| Node Identifier | Latest Clock | Maximum Sequence Number |
| --- | --- | --- |
| Node 103 | 17 | 4 |
| Node 109 | 19 | 3 |
| Node 111 | 14 | 7 |
| Node 113 | 15 | 4 |
| Node 115 | 17 | 9 |

Figure 2:
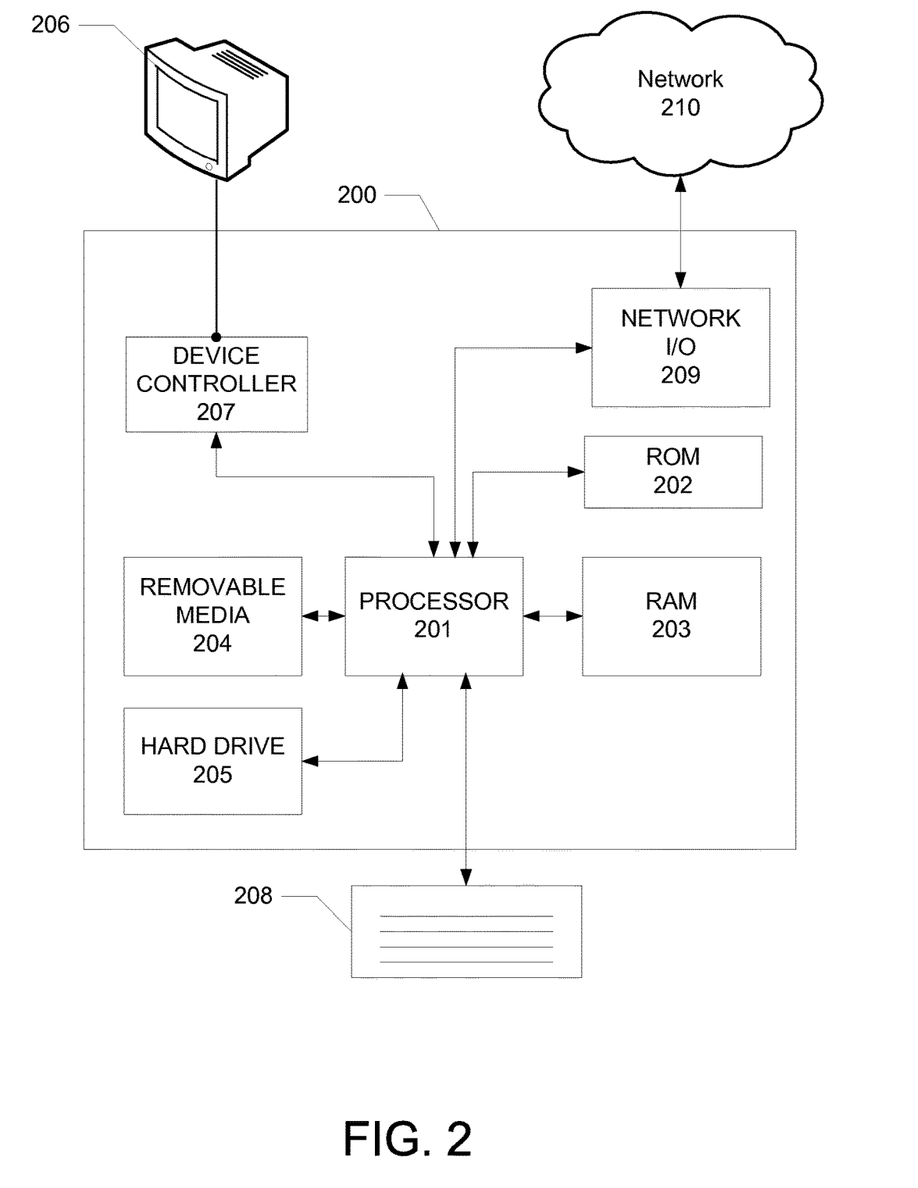
FIG. 2 illustrates an example hardware and software platform on which the various elements described herein can be implemented.

FIG. 2 illustrates general hardware and software elements that can be used to implement any of the various computing devices (e.g., distribution devices, nodes, terminal devices, remote control devices, etc.) discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc.

The computing device 200 may also include one or more network interfaces 209, such as input/output circuits (such as a network card) to communicate with an external network 210. The interface 209 may be a wired interface, wireless interface, or a combination of the two. In some embodiments, the interface 209 may include a modem (e.g., a cable modem), and the network 210 may include the communication links discussed above, a provider's wireless, coaxial, fiber, or hybrid fiber/coaxial distribution system (e.g., a DOCSIS network), or any other desired network. The computing device 200 may communicate with the external networks 210 or other devices using one or more communication protocols, such as wired communication protocols and wireless communication protocols (e.g., Wi-Fi, Bluetooth, ZigBee, Z-Wave, etc.).

Figure 3:
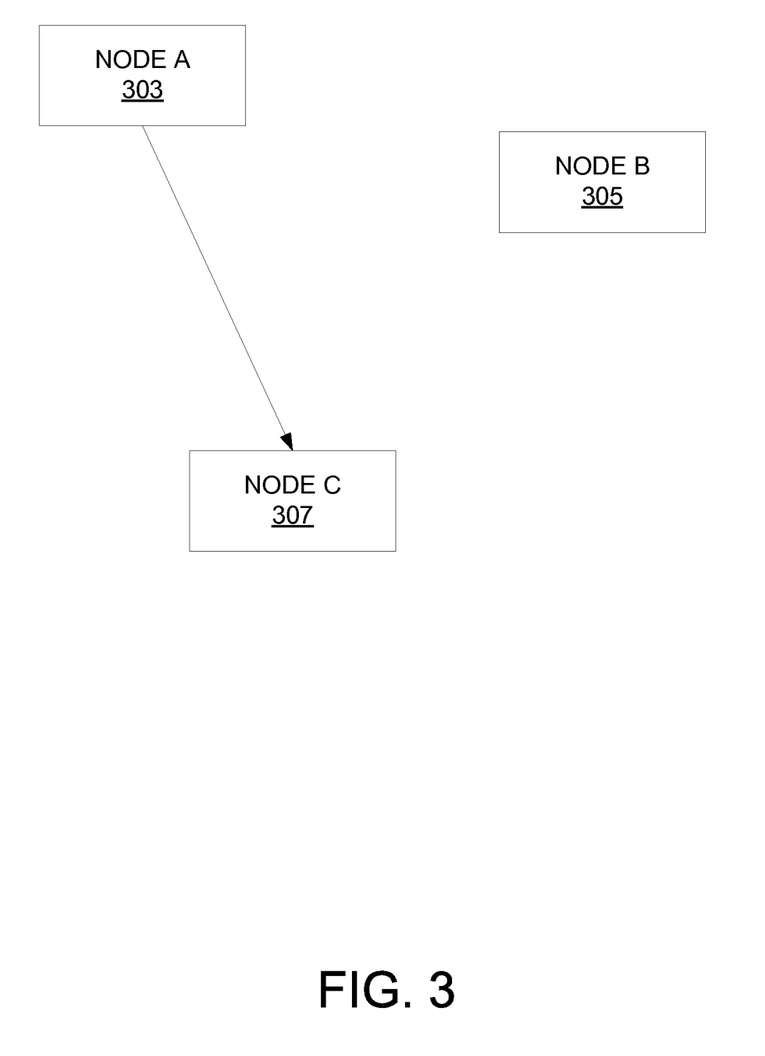
FIG. 3 illustrates an example network of three nodes according to one or more illustrative aspects of the disclosure.

FIG. 3 illustrates an example network of three nodes Node A (303), Node B (305), and Node C (307) according to one or more illustrative aspects of the disclosure. The entire network may comprise only Nodes A-C. Alternatively, Nodes A-C may comprise a subset of the nodes in the network, such as the network 100 illustrated in FIG. 1. For example, Nodes A-C may comprise port-of-entry nodes 103, 105, and 107 illustrated in FIG. 1. Nodes A-C may be synchronized by ensuring that each node receives every task and that each node executes the tasks in the same order, or a predetermined order. For example, if a user device or a client has sent (through the distribution device 101 illustrated in FIG. 1) four tasks (task 1, task 2, task 3, and task 4), each of the nodes may attempt to execute each of tasks 1-4 in that order. In the example illustrated in FIG. 3, Node C may receive a task from Node A. Prior to executing the task, Node C may determine stability of the task with respect to Node A, Node B, and any other nodes in the network. Stability calculations will be described in further detail in the examples that follow, such as with reference to FIGS. 5, 6A, and 6B.

Figure 4:
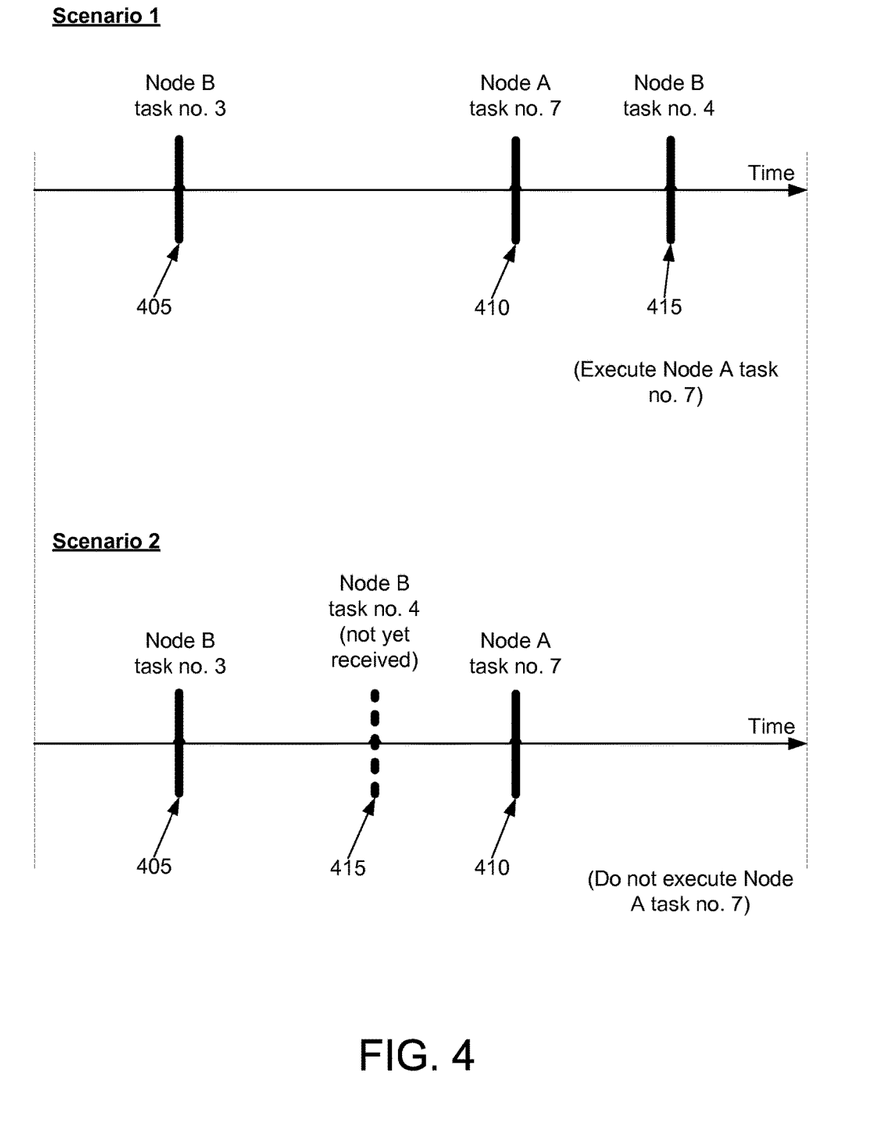
FIG. 4 illustrates an example ordered execution of tasks according to one or more illustrative aspects of the disclosure.

FIG. 4 illustrates an example ordered execution of tasks according to one or more illustrative aspects of the disclosure. In particular, FIG. 4 illustrates two scenarios for Node C. In scenario 1, Node C may determine to execute the task received from Node A (Node A, task No. 7 (410)). In scenario 2, on the other hand, Node C may determine not to execute the task received from Node A (Node A, task No. 7 (410)) and instead store, or otherwise allocate, the task for future execution. In each scenario, assume that Node C has already executed Node A task No. 6 (not illustrated), which is the task originating at Node A that immediately precedes Node A, task No. 7. In each of the scenarios illustrated in FIG. 4, Node C may determine whether Node A, task No. 7 is stable at Node C with respect to Node B prior to executing (or storing) Node A, task No. 7 (410).

Node C may determine that a task (e.g., Node A, task No. 7) is stable with respect to a particular node (e.g., Node B) if any missing tasks that Node B would send to Node C should be executed after Node A, task No. 7. In scenario 1 illustrated in FIG. 4, Node C may determine the most recent task from Node B that Node C has already executed, e.g., Node B, task No. 3 (405). Node C may also determine whether a timestamp for the next (unexecuted) task from Node B, e.g., Node B, task No. 4 (415), is later than the timestamp for Node A, task No. 7. In scenario 1, because Node C has executed Node B, task No. 3 (405) and Node B, task No. 4 (415) has a later timestamp than Node A, task No. 7, Node C may determine that Node A, task No. 7 is stable with respect to Node B. Accordingly, Node C may determine to execute Node A, task No. 7 (410).

On the other hand, Node C may determine that the task Node A, task No. 7 (410) is not stable with respect to Node B if a missing task that Node B would send to Node C should be executed before Node A, task No. 7 or that Node C cannot determine whether the missing task should be executed before Node A, task No. 7. In scenario 2, Node C may determine that Node B, task No. 4 (415) should be executed before Node A, task No. 7 (410) or that Node C cannot determine whether Node B, task no. 4 (415) is earlier in time or later in time than Node A, task No. 7 (410). In this scenario, Node C may determine that Node A, task No. 7 (410) is not stable with respect to Node B and store Node A, task No. 7 for future execution (e.g., after it determines that Node A, task No. 7 is stable with respect to Node B). How Node C determines stability of tasks with respect to Node B and Node C will be described in further detail below with reference to FIGS. 6A-B.

Figure 5:
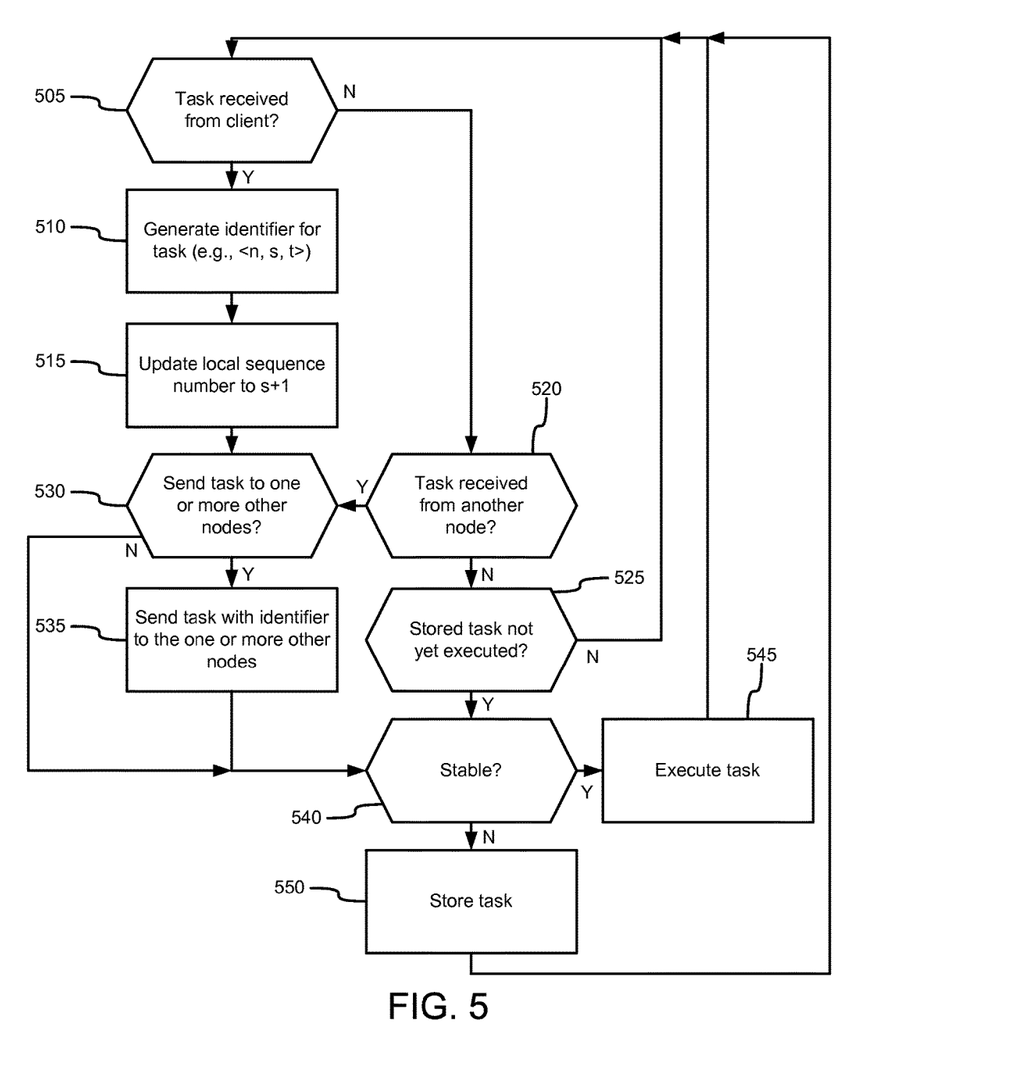
FIG. 5 illustrates an example method of receiving a task, determining whether to send the task to another node, and determining whether to execute the task or store it for later execution according to one or more illustrative aspects of the disclosure.

FIG. 5 illustrates an example method of receiving a task, determining whether to send the task to another node, and determining whether to execute the task or store it for later execution according to one or more illustrative aspects of the disclosure.

In step 505, a first node (e.g., Node A, as illustrated in FIG. 3) may determine whether a task has been received from a client and/or distribution device 101 (e.g., a load balancer). If Node A has received a task from the client (step 505: Y), Node A may generate an identifier for the received task in step 510. An exemplary task identifier (e.g., <n, s, t>) may include an identifier for the originating node (n), a local sequence number (s), and a local timestamp (t). The node identifier (n) may uniquely identify the node generating the task identifier, which may be the node receiving the task from the client and/or distribution device. Exemplary node identifiers include a device name, a media access control (MAC) address, an Internet Protocol (IP) address, or any other unique identifier.

The local sequence number (s) may identify the order that a particular node originated (served as a port of entry for) each task. For example, the first task that Node A originates may be assigned a local sequence number of 1; the second task that Node A originates may be assigned a local sequence number of 2, and so on. In a two node network (e.g., Node A and Node C), the local sequence number may be used by the receiving node (Node C) to determine stability with respect to the sending node (Node A). For example, assume that Node C has executed a first task received from Node A having a local sequence number of 1. If Node C receives, from Node A, a task originating by Node A and having a local sequence number of 3, Node C may store the task having the local sequence number of 3 (instead of executing it) because Node C has not yet executed a task having a local sequence number of 2 originated by Node A. On the other hand, if Node C subsequently receives, from Node A, a second task originated by Node A having a local sequence number of 2, Node C may execute the second task because it has already executed the first task. After Node C executes the second task, it may execute the task having the local sequence number of 3. Accordingly, Node C may execute tasks in the same order as Node A originated the tasks, keeping Node A and Node C synchronized.

Node C may determine which task(s) originated from Node A that Node C is missing based on the globally unique identifier comprising the node identifier n (identifying the port-of-entry Node A) and the local sequence numbers (identifying the order of tasks originated by Node A). Once Node C determines which task(s) originated by Node A it is missing, Node C may send a request to Node A for the missing task. In the above example, Node C may send a request for the second task in response to receiving the task having the local sequence number of 3 and/or otherwise determining that it is missing the second task. Additionally or alternatively, Node C may send a request for the second task to another node, such as Node B. In some aspects, Node C may send a request for a missing task if a threshold period of time from when Node C executed the first task has passed.

The generated task identifier may also include a local timestamp (t). The local timestamp may identify the time, such as a logical time, that the task identifier was generated. The node may determine the local timestamp based on its local clock, which may be stored in the vector of clocks. In some aspects, the local clock may comprise a Lamport clock. Each node's local clock may approximately match a global time, which may be useful if a global clock is not used or is not available. Nodes may attempt to synchronize their local clocks by updating their local clocks as messages (having local timestamps) are received from other nodes. This method may be used by the nodes to minimize clock drift and maintain approximately the same local clock value as other nodes. For example, if Node C receives a task from Node A, and the local timestamp (t) in the task identifier is logical time 17, Node C may update its own local clock to be logical time 17. Alternatively, Node C may update its own local clock to be logical time 17 plus a set amount (e.g., a predetermined amount of time), such as 1. Accordingly, Node C may update its local clock to be logical time 18.

In some aspects, a node may update its local counter to the greater of the currently local counter value or the local timestamp included in the received task or message. For example, Node C's current local counter may be 18. If Node C receives a task from Node A having a logical time 17, Node C may keep its local counter at 18 because it is greater than the time identified in the task identifier (17). On the other hand, if Node C receives a task having a logical time 19, Node C may update its local counter to 19. In addition to updating its local counter, Node C may increment the local counter (after update) by a certain amount, such as 1. The amount to increment by may differ depending on the time format is used. Node C may increment by 1 if a simple counter is used. If 64-bit bit clock values representing time down to the millisecond are used, an increment of 1 may mean incrementing by one millisecond.

In step 515, Node A (the sending node) may update its local sequence number by, for example, incrementing its local sequence number by 1 (e.g., from s to s+1). As previously discussed, Node A may store its own local sequence number in a vector of clocks. By incrementing its local sequence number, Node A may continue to approximate a global clock. As will be discussed below, a node may increment its local sequence number by a value, such as 1, in response to sending the task to another node and/or in response to executing a received task.

Returning to step 505, if Node A has not received a task from the client (step 505: N), Node A may determine, in step 520, whether Node A received a task from another node, such as Node B, Node C, etc. In some aspects, Node A may retrieve a previously received task (which may have been stored in memory at Node A, such as disk storage, solid state storage, etc.) rather than waiting to receive a task in steps 505 and 520 or after checking whether a task has been received from any source. For example, Node A may retrieve the task if it has not received a new task within a period of time. Additionally or alternatively, Node A may periodically retrieve unexecuted, stored tasks to determine whether to execute those tasks. Retrieving a previously stored task will be described in further detail in reference to, for example, step 525.

If Node A received a task from another node (step 520: Y) or the local sequence number is updated in step 515, Node A, in step 530, may determine whether to send the task to one or more other nodes, such as Node C as illustrated in FIG. 3. As previously discussed, Node A may send the task to a subset of other nodes using, for example, a gossip protocol. If Node A decides to send the task to another node, Node A may also increment its local counter by 1. Node A may also increment the timestamp in the task identifier prior to sending the task.

In step 535, Node A may send the task with the identifier to one or more other nodes, such as Node C. As previously discussed, Node A may send the task to a subset of nodes in the network 100 using, for example, a gossip protocol.

Returning to step 520, if Node A has not received a task from another node (step 520: N), Node A may determine, in step 525, whether Node A previously stored a task that has not yet been executed. If Node A does not have a stored task that has not yet been executed (step 525: N), Node A may return to step 505 to wait to receive additional tasks. On the other hand, if Node A has a stored task that has not yet been executed (step 525: Y) or a received task that has not yet been executed, Node A may determine whether the task is stable with respect to one or more nodes in step 540. Node A may execute the task in step 545 if it is stable with respect to other nodes, such as all of the port-of-entry nodes (e.g., Nodes 103, 105, and 107 illustrated in FIG. 1), or store the task for future execution in step 520 if it is not stable with one or more other nodes. Node A may also increment its local counter by 1 if it executes the task in step 545. Determining stability will be explained in further detail in the examples that follow, including with reference to FIGS. 6A-B.

Figure 6A:
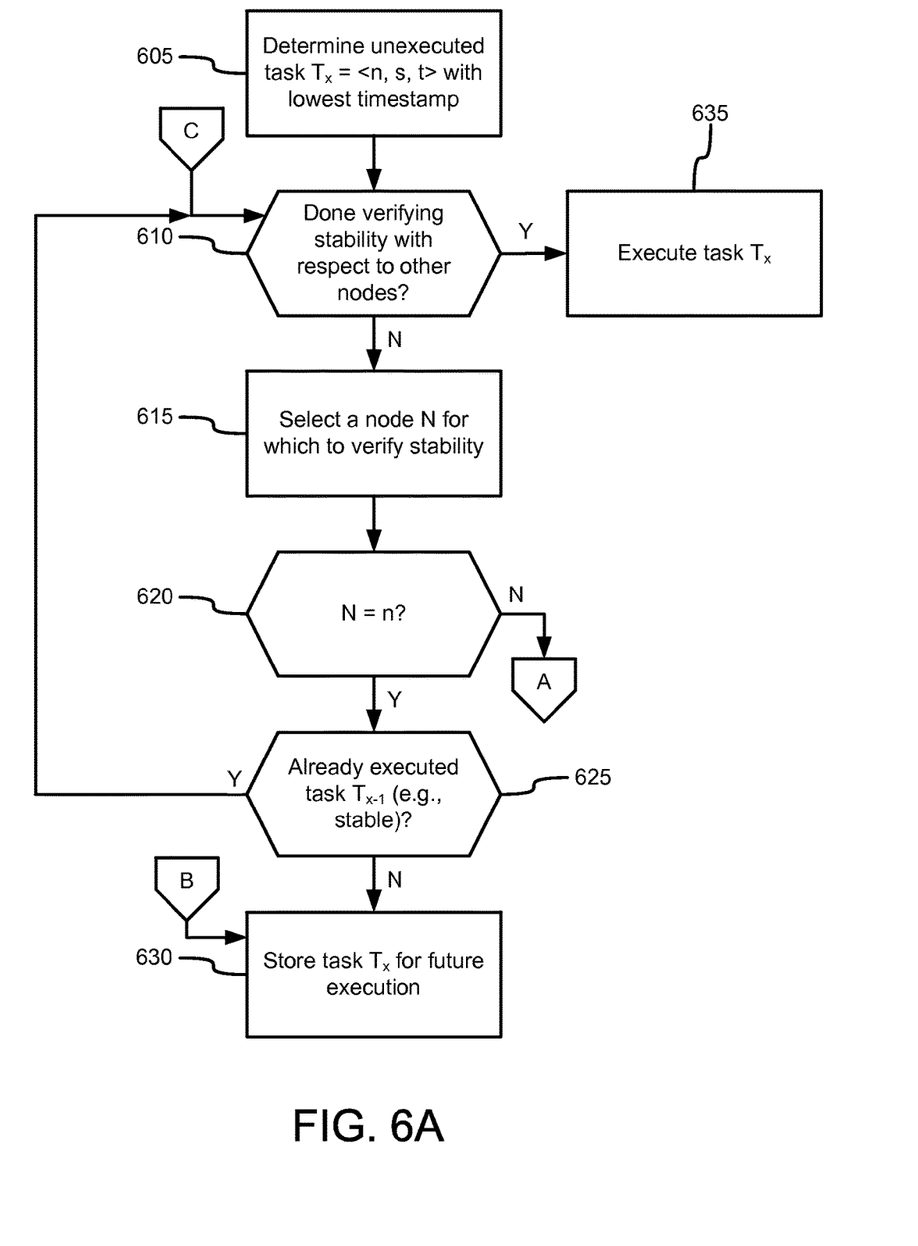
FIGS. 6A-B illustrate an example method of executing tasks in a particular order according to one or more illustrative aspects of the disclosure.
Figure 6B:
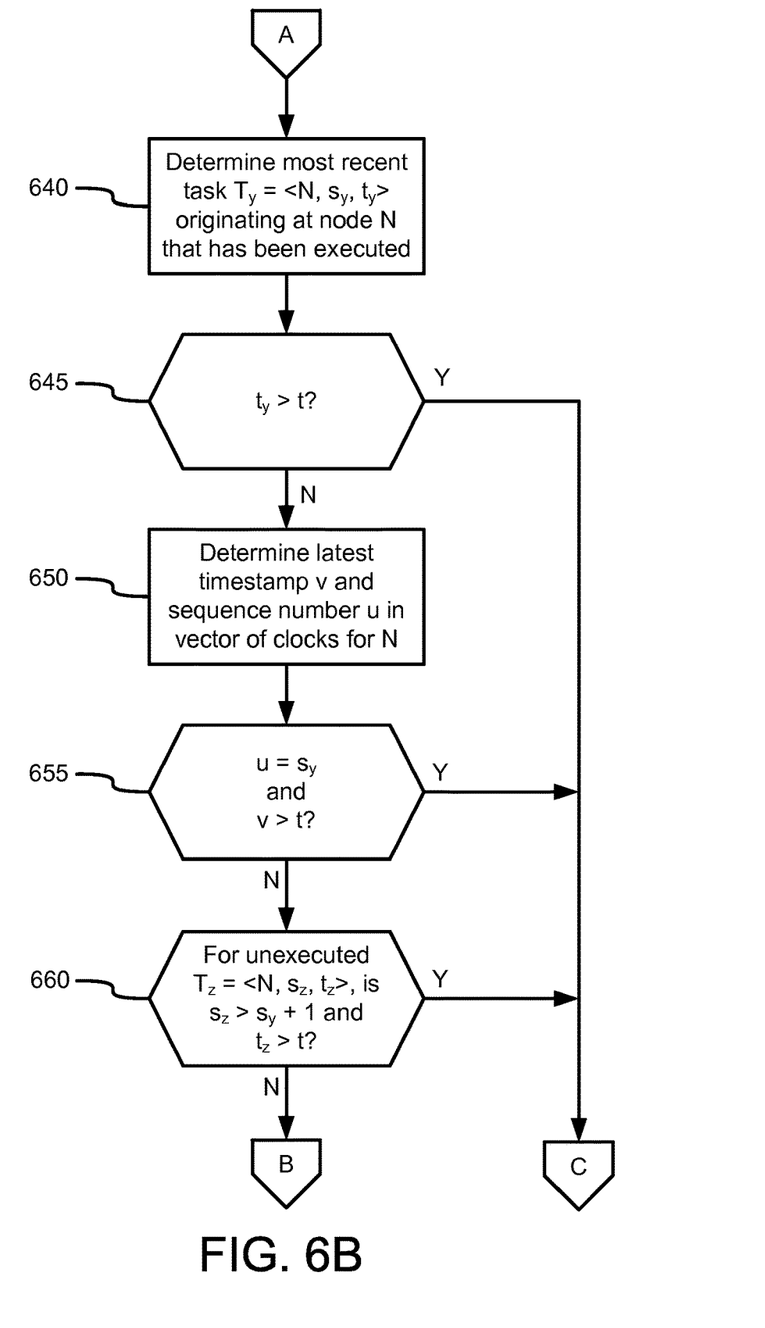

FIGS. 6A-B illustrate an example method of executing tasks in a particular order according to one or more illustrative aspects of the disclosure. As previously discussed, a node receiving a task (e.g., Node C) may determine that the task is stable with respect to one or more other nodes. The receiving node (Node C) may determine that the task is stable with respect to port-of-entry nodes based on the local sequence number. The receiving node may also determine that the task is stable with respect to one or more other non-port-of-entry nodes. Once the receiving node determines that the task is stable with respect to the other nodes, it may execute the task. Determining stability will be explained in further detail in the examples that follow.

In step 605, a first node (e.g., Node C, as illustrated in FIG. 3) may determine (e.g., identify) a task $T_x$ that has not been executed by the first node and that has the lowest timestamp of any such unexecuted tasks. Node C may make this determination based on the identifier (e.g., <n, s, t>) for each such task. For example, Node C may retrieve the task $T_x$ with the lowest timestamp (t) and that has not yet been executed.

In step 610, Node C may determine whether it is done verifying stability of task $T_x$ with respect to other nodes. If Node C is not done verifying stability of task $T_x$ with respect to other nodes (step 610: N), Node C may select, in step 615, a Node N for which to establish stability. For example, Node C may determine whether task $T_x$ is stable with respect to Node A, Node B, or any other node. In some aspects, Node C may determine stability with respect to all of the port-of-entry nodes. Node C may additionally determine stability with respect to non-port-of-entry nodes.

In step 620, Node C may determine whether the selected Node N also originated task $T_x$, such as by comparing the node identifier n in the task identifier for task $T_x$ with the node identifier for Node N. If Node N originated task $T_x$ (step 620: Y), Node C may proceed to step 625.

In step 625, Node C may determine whether the previous task $T_{x-1}$ originating from Node N has already been executed. Node C may determine the sequence number of task $T_x$ from the task identifier. For example, assume that the task $T_x$ has an identifier of <n=Node N, s=7, t=100>. In this example, the sequence number of task $T_x$ is 7. If the task $T_x$ has a sequence number of 7, the previous task $T_{x-1}$ would have a sequence number of 6 and a task identifier of <n=Node N, s=6, t=any value>. In other words, Node C may determine stability with respect to Node N based on whether Node C has already executed task 6 from Node N.

If the previous task $T_{x-1}$ has not been executed (step 625: N), Node C may determine that task $T_x$ is unstable with respect to Node N and may store task $T_x$ in memory for execution in the future in step 630. For example, Node C may execute task $T_x$ at some point in time after it has executed task $T_{x-1}$. Furthermore, Node C may send a request to Node N for task $T_{x-1}$ (and any other tasks with sequence numbers lower than the sequence number of task $T_x$ that Node C has not yet executed). As previously discussed, Node C may send the request for task $T_{x-1}$ to any node. On the other hand, if the previous task $T_{x-1}$ has been executed by Node C (step 625: Y), Node C may determine that task $T_x$ is stable with respect to Node N. Node C may return to step 610 to determine whether to verify stability of task $T_x$ with respect to any other nodes.

If Node C determines that it is done verifying stability of task $T_x$ with respect to other nodes (step 610: Y), Node C may execute task $T_x$ in step 635. For example, Node C may execute task $T_x$ if it has verified stability of task $T_x$ with respect to all port-of-entry nodes. As previously discussed, Node C may increment its local counter by 1 if it executes task $T_x$.

In some aspects, Node C may proceed to determine stability of task $T_x$ with respect to one or more other nodes. For example, in step 610, Node C may determine whether to verify stability of task $T_x$ with respect to another node (e.g., Node B, as illustrated in FIG. 3). In other words, Node C may verify stability of task $T_x$ with respect to nodes that did not originate task $T_x$ to Node C. In general, Node C may determine that task $T_x$ is stable with respect to Node B if any missing tasks that Node B would send to Node C should be executed after task $T_x$.

Assuming that Node C determines to verify stability of task $T_x$ with respect to another node that did not originate task $T_x$, such as Node B, Node C may select Node B in step 615. In step 620, Node C may determine that Node B did not originate task $T_x$ (step 620: N) by comparing the node identifier n in the task identifier for task $T_x$ to the identifier for Node B.

With reference to FIG. 6B, Node C, in step 640, may determine (e.g., identify) the most recent task $T_y$ originating from Node B and already executed by Node C. Node C may determine the most recent task $T_y$ based on the sequence number of $T_y$ ($s_y$) and/or the timestamp of $T_y$ ($t_y$). The most recent executed task may have the greatest sequence number (s) or the largest timestamp (t). For example, the most recent executed task $T_y$ originating from Node B may have a task identifier of <n=Node B, $s_y$=3, $t_y$=90>. In other words, Node C may determine that $T_y$ is the most recent executed task originating from Node B by determining either that $s_y$=3 is the greatest sequence number or that $t_y$=90 is the largest timestamp out of all of the tasks originating from Node B that Node C has executed.

In step 645, Node C may determine whether the timestamp for task $T_y$ ($t_y$) is greater than the timestamp for task $T_x$ (t). If $t_y$>t (step 645: Y), Node C may determine that task $T_x$ is stable with respect to Node B and return to step 610 illustrated in FIG. 6A.

On the other hand, if $t_y \le t$ (step 645: N), Node C, in step 650, may determine the latest timestamp v and sequence number u in the vector of clocks for Node B. As previously discussed, nodes in the network 100 may regularly exchange local clock values with one another. Each node may store and update a vector of clocks, which may include the latest clock value and the maximum local sequence number for each node. In the present example, Node C may determine the latest timestamp v and sequence number u for Node B in step 650.

In step 655, Node C may determine whether the latest timestamp v determined in step 650 is greater than the timestamp of task $T_x$ (t) and sequence number u determined in step 650 is equal to the sequence number of Task $T_y$ ($s_y$). For example, assume that the latest timestamp for Node B in the vector of clocks is v=110, and B's local sequence number was still u=3 at v=110. In this example, because the latest clock entry for Node B (v=110) is greater than the timestamp of task $T_x$ (t=100) (e.g., step 655: Y) and the sequence number u is the same as the sequence number $s_y$, Node C may determine that task $T_x$ is stable with respect to Node B. In other words, if the highest sequence number for Node B (u) is the same as the sequence number of task $T_y$, then Node C is not missing any tasks from Node B. If also v>t, then Node C knows that if Node B were to subsequently originate another task, that task would be ordered after task $T_x$ because it would have a higher timestamp. Node C knows that there is not an outstanding request originating from Node B which would be sorted earlier than $T_x$ received from Node N. That is, at time v=110, Node B has not yet originated its task number 4. Even if Node B has sent task number 4 to a different node (e.g., task number 4 is out in the network 100 somewhere), Node C would still sort task number 4 after task $T_x$ because task number 4 would have a higher timestamp. Accordingly, if the latest timestamp for Node B is greater than the timestamp of task $T_x$, Node C may determine that task $T_x$ is stable with respect to Node B and return to step 610 illustrated in FIG. 6A to determine whether to verify stability of task $T_x$ with respect to another node.

On the other hand, the latest timestamp for Node B might not be greater than the timestamp of task $T_x$ (step 655: N). For example, the latest clock entry for Node B may be v=90, which is less than the timestamp of task $T_x$ (t=100). If u=$s_y$ but v≤t, then it is possible that Node B might originate (or has already originated, but Node C has not yet received it) a task that should be ordered before task $T_x$. Accordingly, it might not be safe to execute task $T_x$ yet. In other words, Node B's task 4 might be out in the network with a timestamp between 90 and 100. Similarly, the same may be said if the latest timestamp for Node B said that at time t=110 and B's local sequence number was $s_y$=4. In these cases, Node C may proceed to step 660.

In step 660, Node C may identify the next unexecuted task $T_z$ originating from Node B and having a task identifier of <n=Node B, $s_z$, $t_z$>. Node C may determine whether $s_z$=$s_y$+1 and $t_z$>t. If so (step 660: Y), Node C may determine that task $T_x$ is stable with respect to Node B and return to step 610 illustrated in FIG. 6A. If not (step 660: N), Node C cannot conclude that $T_x$ is stable with respect to Node B. Node C may determine that task $T_x$ is unstable with respect to Node B and store task $T_x$ for future execution in step 630. In other words, in step 660, Node C may determine whether Node C already has the next unexecuted task from Node B, and the unexecuted task has a higher timestamp than task $T_x$.

In some aspects, Node C may receive a task that originated at Node A (e.g., task R) and a task that originated at Node B (e.g., task Q) having the same local timestamp (e.g., t=110). In step 605, Node C may break the tie based on priority of the nodes, which may be predetermined. For example, Node A may be assigned a higher priority than Node B, and Node C may execute task R (originating from Node A) before executing task Q (originating from Node B) based on the priority. In other words, the task determined in step 605 may be Task R, rather than task Q, even though both are unexecuted and have the same, lowest timestamp. Subsequently, Node C may perform the previously-described stability calculations for task Q.

Returning to FIG. 6A, if Node C determines that task $T_x$ is stable with respect to both Node A and Node B, Node C may determine stability of task $T_x$ with respect to any number of other nodes in a similar manner as that described above. In step 610, Node C may decide whether to determine stability of task $T_x$ with respect to another node. In some aspects of the present disclosure, a network may include many nodes (e.g., 1,000 nodes), such as in a large server cluster. Node C may determine stability of task $T_x$ with respect to port-of-entry nodes. Additionally, Node C may determine stability of task $T_x$ with respect to one or more non-port-of-entry nodes. Returning to FIG. 6A, if the node is done determining stability (Step 610: Y) and the node has determined task $T_x$ is stable with respect to the other nodes, the node may execute the task in step 635.

In some aspects, a node that executes a task may provide feedback by generating a response indicating that the node executed the task and forwarding the response to the client that generated the task and/or the distribution device 101. The node may send the response back to the sending node or directly to the distribution device 101 if the node received the task from the distribution device 101. For example, the node may determine whether it is the originating node or not. If it is the originating node (e.g., node 105), it may forward the response back to the client (not illustrated). If it is not the originating node (e.g., node 113), it may forward the response back to the originating node (node 105), so that the originating node may forward the response back to the client. In some aspects, the originating node may forward the response back to the client independently of whether the task is actually stable and executable at the originating node (node 105). This allows for the response to be generated by the lowest latency node and lowest latency path so that the client may see latency and task execution as quick as the fastest node to execute the task. In other words, the client may receive a result of task execution as early as possible. This also prevents multiple nodes from sending back responses.

The various features described above are merely non-limiting examples, and can be rearranged, combined, subdivided, omitted, and/or altered in any desired manner. For example, features of the computing devices described herein (which may be one of the nodes, the distribution device 101, or any other device) can be subdivided among multiple processors and computing devices. The true scope of this patent should only be defined by the claims that follow.

We claim:
1. A method comprising:
   determining whether a first task originated from a first node in a network of nodes;
   responsive to a determination that the first task did not originate from the first node in the network of nodes, determining, by a second node in the network of nodes, whether a first timestamp for the first task is prior in time to a second timestamp for a second task originating from the first node and previously executed by the second node;

responsive to determining that the first timestamp for the first task is prior in time to the second timestamp for the second task, determining that the first task is stable at the second node with respect to the first node; and responsive to determining that the first task is stable at the second node with respect to the first node, executing, by the second node, the first task.

2. The method of claim 1, wherein the determination that the first task did not originate from the first node comprises a determination that a third node in the network of nodes received the first task from a client device that generated the first task.

3. The method of claim 1, wherein the determination that the first task did not originate from the first node comprises a determination that a third node in the network of nodes is identified in a task identifier of the first task.

4. The method of claim 1, wherein executing the first task is further responsive to a determination that the second node is stable with respect to a third node.

5. The method of claim 1, further comprising:
responsive to a determination that a third task did not originate from the first node in the network of nodes, determining, by the second node, whether a third timestamp for the third task is prior in time to the second timestamp for the second task originating from the first node and previously executed by the second node; and
responsive to determining that the third timestamp for the third task is not prior in time to the second timestamp for the second task, determining that the third task is not stable at the second node with respect to the first node.

6. The method of claim 5, further comprising:
responsive to determining that the third task is not stable at the second node with respect to the first node, storing, by the second node, the third task in memory.

7. The method of claim 1, further comprising:
responsive to a determination that a third task did not originate from the first node in the network of nodes, determining, by the second node, whether a third timestamp for the third task is prior in time to the second timestamp for the second task originating from the first node and previously executed by the second node;
responsive to determining that the third timestamp for the third task is not prior in time to the second timestamp for the second task, determining whether a latest clock value for the first node is greater than the third timestamp for the third task and whether a maximum sequence number for the first node is equal to a sequence number for the second task; and
responsive to determining that the latest clock value for the first node is greater than the third timestamp for the third task and the maximum sequence number for the first node is equal to the sequence number for the second task, determining that the third task is stable at the second node with respect to the first node.

8. An apparatus comprising:
one or more processors; and
memory storing instructions that, when executed by the one or more processors, cause the apparatus to:
determine whether a first task originated from a second apparatus in a network of apparatuses;
responsive to a determination that the first task did not originate from the second apparatus in the network of apparatuses, determine whether a first timestamp for the first task is prior in time to a second timestamp for a second task originating from the second apparatus and previously executed by the apparatus;
responsive to determining that the first timestamp for the first task is prior in time to the second timestamp for the second task, determine that the first task is stable at the apparatus with respect to the second apparatus; and
responsive to determining that the first task is stable at the apparatus with respect to the second apparatus, execute the first task.

9. The apparatus of claim 8, wherein the determination that the first task did not originate from the second apparatus comprises a determination that a third apparatus in the network of apparatuses received the first task from a client device that generated the first task.

10. The apparatus of claim 8, wherein the determination that the first task did not originate from the second apparatus comprises a determination that a third apparatus in the network of apparatuses is identified in a task identifier of the first task.

11. The apparatus of claim 8, wherein the instructions, when executed by the one or more processors, cause the apparatus to execute the first task further responsive to a determination that the apparatus is stable with respect to a third apparatus.

12. The apparatus of claim 8, wherein the instructions, when executed by the one or more processors, cause the apparatus to:
responsive to a determination that a third task did not originate from the second apparatus in the network of apparatuses, determine whether a third timestamp for the third task is prior in time to the second timestamp for the second task originating from the second apparatus and previously executed by the apparatus; and
responsive to determining that the third timestamp for the third task is not prior in time to the second timestamp for the second task, determine that the third task is not stable at the apparatus with respect to the second apparatus.

13. The apparatus of claim 12, wherein the instructions, when executed by the one or more processors, cause the apparatus to:
responsive to determining that the third task is not stable at the apparatus with respect to the second apparatus, store the third task in memory.

14. The apparatus of claim 8, wherein the instructions, when executed by the one or more processors, cause the apparatus to:
responsive to a determination that a third task did not originate from the second apparatus in the network of apparatuses, determine whether a third timestamp for the third task is prior in time to the second timestamp for the second task originating from the second apparatus and previously executed by the apparatus;
responsive to determining that the third timestamp for the third task is not prior in time to the second timestamp for the second task, determine whether a latest clock value for the second apparatus is greater than the third timestamp for the third task and whether a maximum sequence number for the second apparatus is equal to a sequence number for the second task; and
responsive to determining that the latest clock value for the second apparatus is greater than the third timestamp for the third task and the maximum sequence number for the second apparatus is equal to the sequence number for the second task, determine that the third task is stable at the apparatus with respect to the second apparatus.

15. A system comprising:
a first node and a second node,
wherein the first node comprises:
  one or more processors; and
  memory storing executable instructions that, when executed by the one or more processors of the first node, cause the first node to:
    send, to the second node, a first task; and
wherein the second node comprises:
  one or more processors; and
  memory storing executable instructions that, when executed by the one or more processors of the second node, cause the second node to:
    receive, from the first node, the first task;
    determine whether the first task originated from the first node;
    responsive to a determination that the first task did not originate from the first node, determine whether a first timestamp for the first task is prior in time to a second timestamp for a second task originating from the first node and previously executed by the second node;
    responsive to determining that the first timestamp for the first task is prior in time to the second timestamp for the second task, determine that the first task is stable at the second node with respect to the first node; and
    responsive to determining that the first task is stable at the second node with respect to the first node, execute the first task.

16. The system of claim 15, further comprising a third node, wherein the determination that the first task did not originate from the first node comprises a determination that the third node received the first task from a client device that generated the first task.

17. The system of claim 15, further comprising a third node, wherein the determination that the first task did not originate from the first node comprises a determination that the third node is identified in a task identifier of the first task.

18. The system of claim 15, wherein the instructions in the memory of the second node, when executed by the one or more processors of the second node, cause the second node to:
  responsive to a determination that a third task did not originate from the first node, determine whether a third timestamp for the third task is prior in time to the second timestamp for the second task originating from the first node and previously executed by the second node; and
  responsive to determining that the third timestamp for the third task is not prior in time to the second timestamp for the second task, determine that the third task is not stable at the second node with respect to the first node.

19. The system of claim 18, wherein the instructions in the memory of the second node, when executed by the one or more processors of the second node, cause the second node to:
  responsive to determining that the third task is not stable at the second node with respect to the first node, store the third task in memory.

20. The system of claim 15, wherein the instructions in the memory of the second node, when executed by the one or more processors of the second node, cause the second node to:
  responsive to a determination that a third task did not originate from the first node, determine whether a third timestamp for the third task is prior in time to the second timestamp for the second task originating from the first node and previously executed by the second node;
  responsive to determining that the third timestamp for the third task is not prior in time to the second timestamp for the second task, determine whether a latest clock value for the first node is greater than the third timestamp for the third task and whether a maximum sequence number for the first node is equal to a sequence number for the second task; and
  responsive to determining that the latest clock value for the first node is greater than the third timestamp for the third task and the maximum sequence number for the first node is equal to the sequence number for the second task, determine that the third task is stable at the second node with respect to the first node.

* * * * *

UNITED STATES PATENT AND TRADEMARK OFFICE
CERTIFICATE OF CORRECTION

PATENT NO. : 10,091,288 B2
APPLICATION NO. : 14/668451
DATED : October 2, 2018
INVENTOR(S) : Moore et al.

It is certified that error appears in the above-identified patent and that said Letters Patent is hereby corrected as shown below:

On the Title Page

Page 2, Column 1, Other Publications, Line 17:
Please delete "Parrallel" and insert --Parallel--

Signed and Sealed this
Twenty-sixth Day of February, 2019

Andrei Iancu
*Director of the United States Patent and Trademark Office*